United States Patent [19]

Fisher

[11] Patent Number: 4,704,067

[45] Date of Patent: Nov. 3, 1987

[54] HELICOIDAL PROPELLER PITCH CONTROL MECHANISM

[76] Inventor: Robin D. Fisher, 1040 Wass, Apt. D, Tustin, Calif. 92680

[21] Appl. No.: 874,841

[22] Filed: Jun. 16, 1986

[51] Int. Cl.$^4$ .......................... B64C 11/36; B63H 3/04
[52] U.S. Cl. .................................. 416/167; 416/168 R
[58] Field of Search ............... 416/167, 165, 133, 149, 416/150, 147, 161, 168

[56] References Cited

U.S. PATENT DOCUMENTS

| | | | |
|---|---|---|---|
| 1,279,742 | 9/1918 | Mott | 416/168 X |
| 1,840,148 | 1/1932 | Berry | 416/167 X |
| 2,008,771 | 7/1935 | Reed | 416/133 |
| 2,255,004 | 9/1941 | Rodanet | 416/205 X |
| 2,309,899 | 2/1943 | Hepperle | 416/162 |
| 2,953,208 | 9/1960 | O'Connor | 416/147 |
| 3,619,081 | 11/1971 | Gruska | 416/70 |

*Primary Examiner*—Everette A. Powell, Jr.
*Attorney, Agent, or Firm*—William L. Chapin

[57] ABSTRACT

A pitch control mechanism for propellers uses an elongated flat strip twisted into a helicoidal. The helicoidal is longitudinally slidable within a hollow propeller shaft. A cup-shaped cylindrical control ring coaxially mounted with respect to the front transverse surface of the propeller shaft is supported by an inner bearing ring permitting both longitudinal and rotational movement of the control ring relative to the propeller shaft. The control ring has a rectangular slot in its disc-shaped front face which fits conformally over the transverse cross section of the helicoidal. Longitudinal motion of the helicoidal therefore causes rotation of the control ring. Propeller blades are fastened to support rods terminating in downward extending, bifurcated fork-like support structures. The front tine of each fork is rotatably supported in a radial hole in the control ring, while the rear tine is rotatably supported by an axial hole in the propeller shaft. Rotation of the control ring relative to the propeller shaft causes rotation of each propeller blade support rod about its own axis, effecting uniform change in pitch of each propeller blade.

20 Claims, 6 Drawing Figures

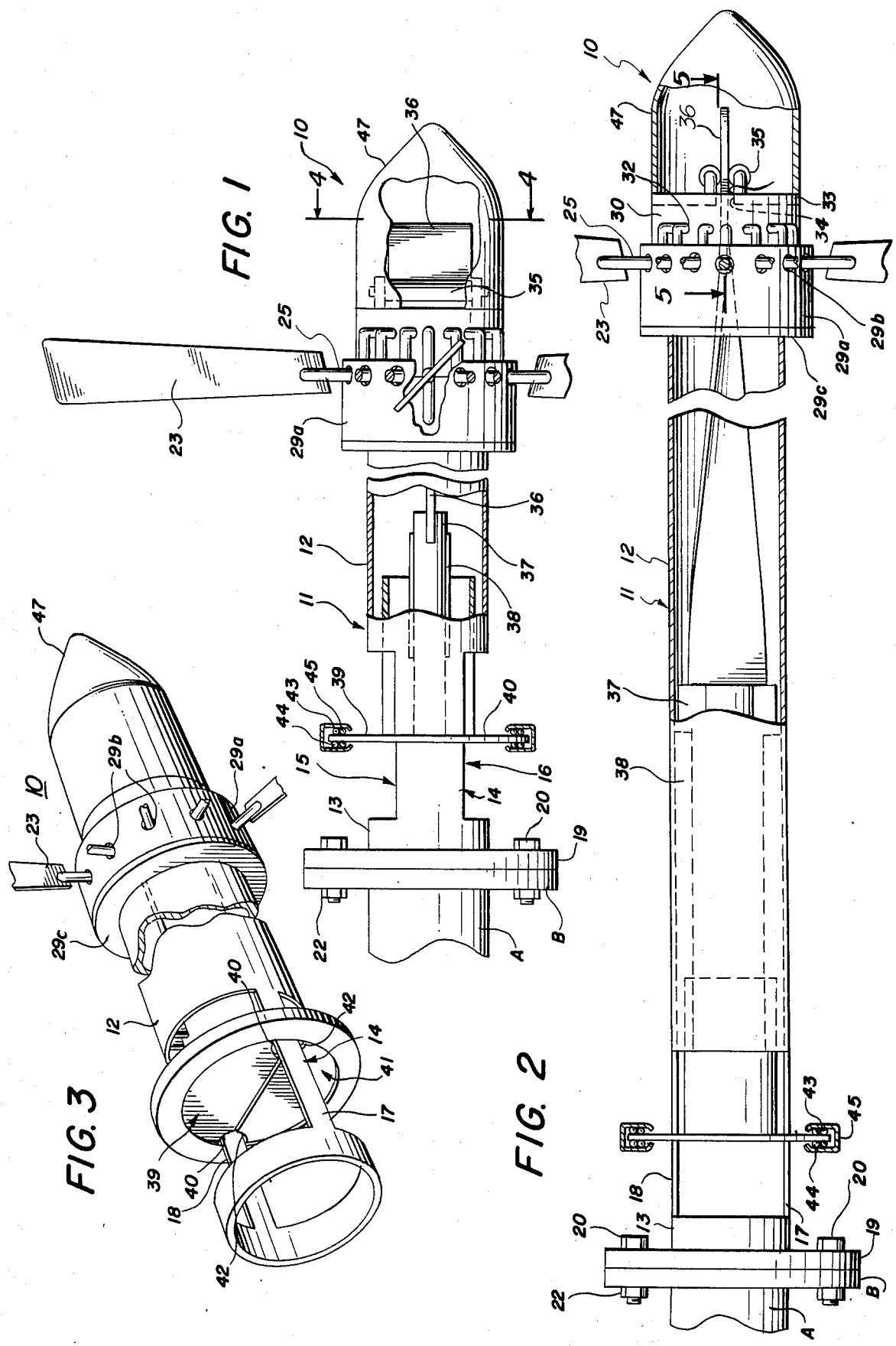

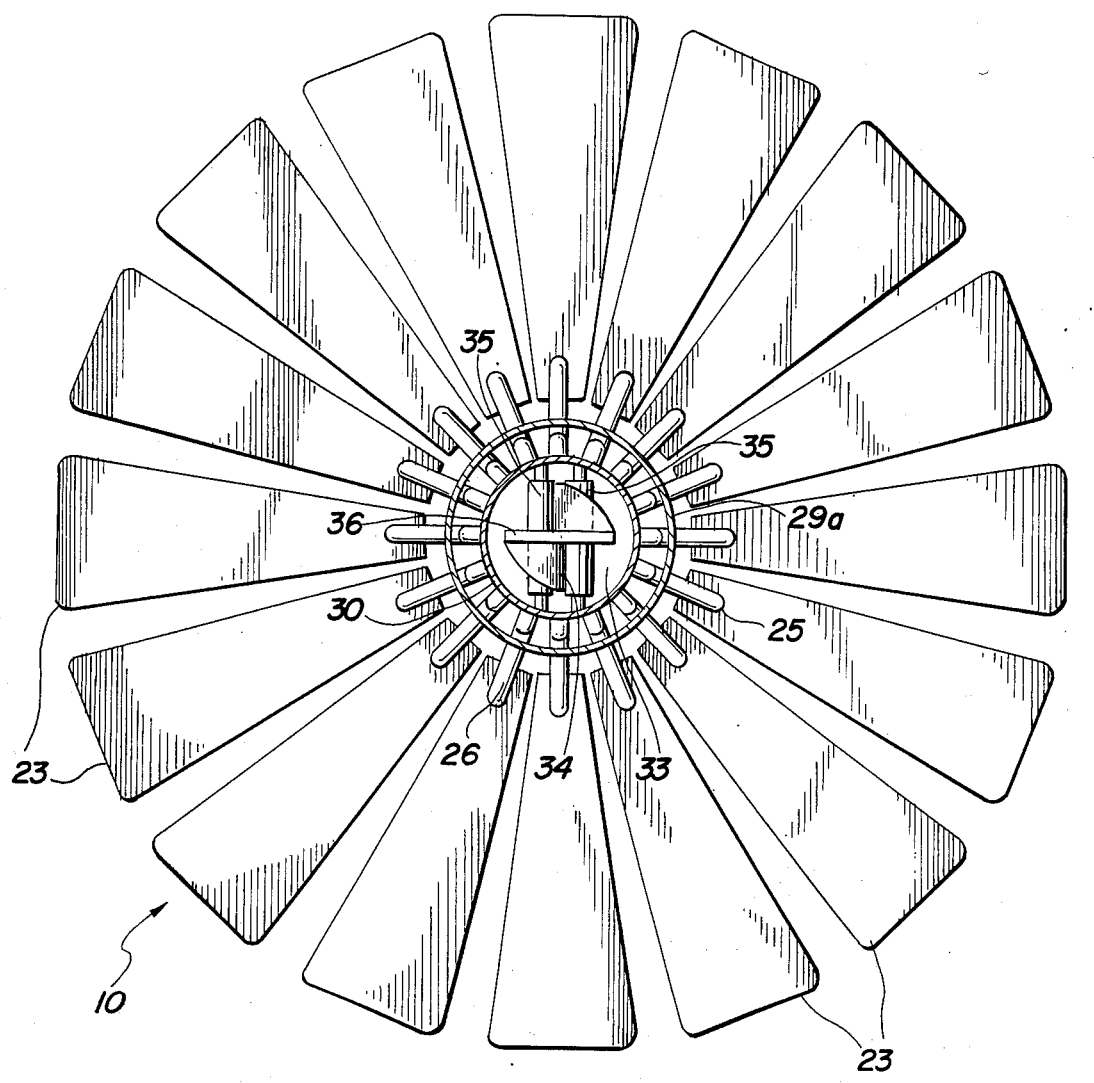
FIG. 4
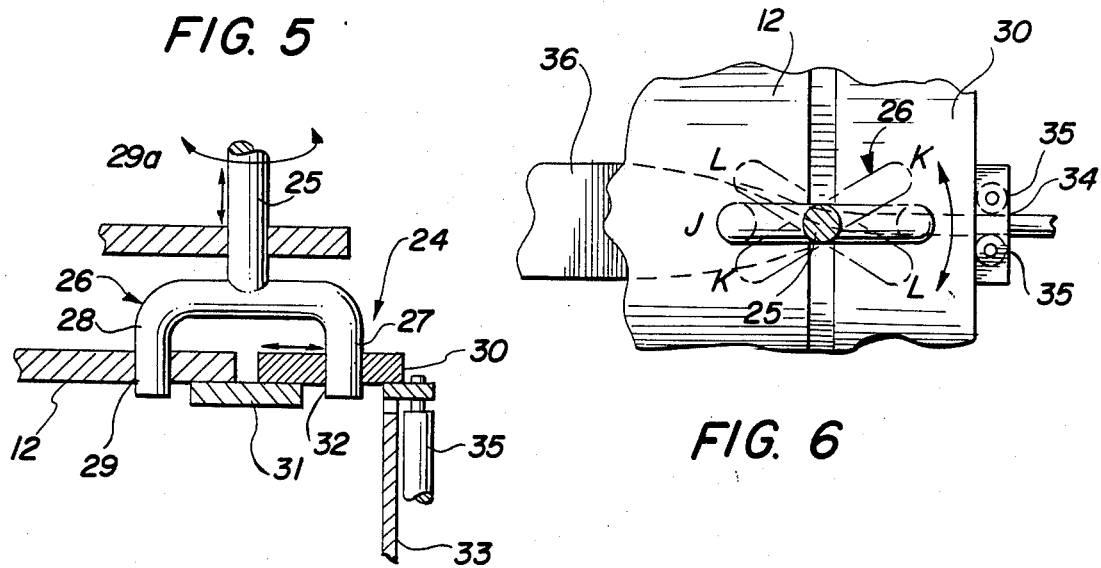
FIG. 5
FIG. 6

HELICOIDAL PROPELLER PITCH CONTROL MECHANISM

BACKGROUND OF THE INVENTION

1. Field of the Invention

This invention relates to mechanisms for adjusting the pitch of propellers. More particularly, the invention relates to mechanisms having the capability of changing the pitch of blades in wind driven turbines, aircraft propellers and the like while the blade hub is rotating.

2. Description of Background Art

Rotating propellers are used extensively to move air or water, or to extract kinetic energy from moving water or air. Examples of propellers in the first category include aircraft and boat propellers. The second category includes water turbines used to generate hydroelectric power, and windmills coupled to electric generators. These are used to take advantage of moving water or wind as a source of energy.

In many instances, it is desirable to provide a variable pitch capability to the blades of a propeller. For example, a boat propeller used to propel a heavy boat at low speeds works more efficiently if the blades are twisted so that the planes of the blades make large angles with the rotational axis of the propeller. For high speed operation, boat propellers having a small pitch, characterized by small angles of attack of the propeller blades relative to their rotation circle, are more efficient.

The requirement for varying the pitch of propeller blades to optimize the performance of the propeller for varying speed and load conditions has prompted development of a number of designs for pitch control mechanisms. For example, Hepperle, in U.S. Pat. No. 2,309,899, issued Feb. 2, 1943 discloses a pitch control mechanism for aircraft propellers made of flexible wooden laminations in which an axially disposed helicoid gear is moveable longitudinally within an internally threaded propeller hub extension. Moving the helicoid gear causes the hub extension to be rotated with respect to a drive rod on which the helicoid gear is mounted, and also with respect to a hollow propeller shaft which coaxially encloses the drive rod. The mechanism includes a split collar having an annular flange which fits into an annular recess at the rear of the propeller hub. The halves of the split collar are held together by a lock ring. Flexible rods fixed in the short front lamina of a laminated propeller blade extend longitudinally backward through bores in intermediate length lamina, through bores in shorter rear lamina, and into adjacent bores in the split ring.

When the propeller hub is caused to rotate with respect to the hollow propeller shaft by axial movement of the drive rod, the flexible rods move out of parallel alignment with the shaft, causing the front ends of all of the flexible rods as well as the hub structures interconnected by the rods to move. The movement is progressively larger in the direction from substantially stationary rear lamina forwards to larger movement of front, short lamina, thus varying the pitch of the propeller blades.

O'Connor, in U.S. Pat. No. 2,953,208, issued Sept. 20, 1960 discloses a variable pitch marine propeller. Each blade of the propeller has a pivot shaft which extends outward from the base portion of the blade, near the leading edge of the blade. The pivot shafts are fastened to a retaining ring which fits over the hub of the propeller. The method of fastening secures the pivot shafts against axial movement, but permits rotation of each pivot shaft about its longitudinal axis. Circular transverse cross-section guide detents extending outward from the base of each blade's trailing edge ride within a helical groove machined into the outer surface of a guide control ring fitted coaxially over the outward end of the hub. Rotating the guide control ring with respect to the hub and the retainer ring causes movement of the detents in the helical groove, swinging the blades about the pivot shafts, causing the pitch of the propeller to change.

The examples of prior art pitch control mechanism cited above may be useful for their intended purposes. However, they are not well suited to use in wind turbine applications, for the following reasons. The Hepperle pitch control mechanism is heavy, cannot accommodate a large number of blades and requires a flexible external covering over each blade to maintain an airfoil. The O'Connor mechanism has a limited number of blades, and pitch can only be adjusted by hand when the propeller is stopped. Pitch control mechanisms for wind turbine applications require somewhat different performance characteristics. These characteristics will now be described.

To operate efficiently at low wind velocities, a wind turbine ideally has a larg- number of blades extending radially outward from a central hub, with the planes of the blades aligned nearly perpendicular to the wind vector. Wind turbines of this type, having a large number of blades and a small pitch, are typified by the farm windmills which were used extensively in this country during the first half of the twentieth century, primarily to power water pumps. Most old-style farm wind turbines did not have any provision for changing their pitch.

Presently used wind turbines usually have a small number of blades, typically two to four. To a large extent, present wind turbines are limited in the number of blades mounted on the turbine hub by the excessive weight of existing pitch control mechanisms. It is disadvantageous to decrease the number of propeller blades, since turbines having a larger number of blades can transmit a larger torque to the turbine shaft. Therefore, turbines with more blades are more efficient in converting wind energy into turbine shaft power. In most wind turbine applications, the turbine shaft is coupled to the input shaft of an electrical generator. Thus, more electrical power can be produced from a given amount of available wind power by turbines having a larger number of blades.

When a wind-driven turbine is exposed to high wind velocities, it is necessary to decrease the pitch of the propeller blades, to prevent ihe propeller shaft from rotating at excessive speeds. Reduction in pitch is accomplished by twisting the blades around their own longitudinal axes to position the plane of the blades more nearly parallel to the propeller axis, and to the wind vector. In extremely high winds, it is sometimes desirable to bring the pitch of the propeller blades to a position referred to as full feather. In this position, the flat surfaces of the propeller blades are made parallel to the propeller axis and to wind vector, so that little or no rotation of the propeller is caused by the wind.

The present invention was conceived of in response to a perceived need for a pitch control mechanism which is lighter, more durable, more easily constructed and maintained than prior disclosed pitch control mechanisms.

OBJECTS OF THE INVENTION

An object of the present invention is to provide a pitch control mechanism for rotating propeller or turbine blades in which the pitch of the blades may be varied with the propeller shaft either stationary or rotating.

Another object of the invention is to provide a pitch control mechanism which is adaptable to turbines having a small or large number of blades.

Another object of the invention is to provide a pitch control mechanism adaptable to various blade planforms or configurations.

Another object of the invention is to provide a pitch control mechanism in which the pitch settings are infinitely variable and quickly adjusted.

Another object of the invention is to provide a pitch control mechanism in which the pitch may be varied to both positive and negative values from a central, neutral pitch position all the way to a flat pitch.

Various other objects and advantages of the present invention, and its most novel features, will become apparent to those skilled in the art by reading the accompanying specifications and claims.

It is to be understood that although the invention disclosed herein is fully capable of achieving the objects and providing the advantages described, the characteristics of the invention described herein are merely illustrative of the preferred embodiment. Accordingly, I do not intend that the scope of my exclusive rights and privileges in the invention be limited to details of the embodiments described. I do intend that reasonable equivalents, adaptations and modifications of the invention described herein be included within the scope of the invention as defined by the appended claims.

SUMMARY OF THE INVENTION

Briefly stated, the present invention comprehends a mechanism for varying the pitch of propeller blades used in aircraft, wind generators or wind turbines, hydroelectric turbines and the like. The mechanism includes an elongated hollow cylindrical propeller shaft having a plurality of holes spaced at regular polar angles. The holes are disposed radially outward through the cylindrical wall of the propeller shaft, on a circle back a short distance from the front transverse face of the propeller shaft. The propeller shaft holes provide bearing journals for the rear tines of fork-like, bifurcated propeller blade supports.

A support rod extending upwards from a blade support to each propeller blade is stabilized in a fixed radial position by means of a cylindrical stabilizer ring of larger diameter than the propeller shaft and mounted coaxially over the propeller shaft. The stabilizer ring has a plurality of holes disposed radially outward through its cylindrical wall. The holes are on a circle forward of the propeller shaft holes, and each stabilizer ring hole supports a separate propeller support rod.

The front fork tines of the bifurcated propeller blade shafts are rotatably mounted in holes similar to the radial holes in the propeller shaft through a cylindrical control ring of approximately the same diameter as the propeller shaft and rotatably mounted coaxially with respect to the propeller shaft, forward of the front transverse face of the propeller shaft.

The forward surface of the control ring is capped by an integral circular base plate having a diametrically disposed, rectangular aperture cut through it. A pair of closely spaced, parallel cylindrical roller bearings are rotatably mounted to the base plate, on either side of the slot.

An elongated, flat strip twisted into a helicoidal having a twist of at least 90 degrees and up to 180 degrees extends axially through the hollow propeller shaft, out through the rectangular aperture in the base plate. The helicoid strip tangentially contacts facing circumferential surfaces of the roller bearings adjacent the aperture.

When the helicoid strip is moved longitudinally along the rotational axis of the propeller shaft, forward or backward with respect to the control ring, the twisting motion of the helicoid strip causes a clockwise or counter-clockwise torque to be applied to the roller bearings and therefore to the control ring, causing the control ring to rotate with respect to the propeller shaft. Rotation of the control ring relative to the propeller shaft causes the front fork tines of the bifurcated propeller blade shafts to move orbitally with respect to the rear fork tines. This orbital motion causes the propeller blade support rod attached to the center of each blade fork to rotate about its own longitudinal axis, simultaneously changing the pitch of each propeller blade an equivalent amount. It is possible to vary the abruptness of the helicoid twist, and therefore the degree of pitch change corresponding to a given axial movement of the strip.

BRIEF DESCRIPTION OF THE DRAWINGS

FIG. 1 is a partially sectional side elevation view of the helicoidal pitch control mechanism according to the present invention.

FIG. 2 is a top plan view of the apparatus of FIG. 1.

FIG. 3 is a broken perspective view of the apparatus of FIG. 1, as seen from above and behind the apparatus.

FIG. 4 is a front elevation view of the apparatus of FIG. 1.

FIG. 5 is a fragmentary, partially sectional view of part of the apparatus of FIG. 1, taken along line 5—5.

FIG. 6 is a fragmentary, partially sectional view of part of the apparatus of FIG. 2, taken along line 6—6.

DESCRIPTION OF THE PREFERRED EMBODIMENT

Referring now to FIGS. 1 through 6 and especially to FIG. 1, a mechanism 10 for controlling the pitch of propeller or turbine blades according to the present invention is shown.

As may be seen best by referring to FIGS. 1 and 2, pitch control mechanism 10 includes an elongated, hollow, generally cylindrical propeller shaft 11. Propeller shaft 11 includes a substantially long continuous front cylindrical section 12, and a relatively short continuous rear cylindrical section 13. Front and rear propeller shaft sections 12 and 13, respectively, are joined by an intermediate cylindrical section 14. Intermediate section 14 has opposed symmetrical openings 15 and 16 which are preferably formed by cutting or milling away saddle-shaped, diametrically opposed portions of the cylindrical wall of a single continuous cylinder from which propeller shaft 11 is preferably fabricated. Thus, intermediate section 14 has symmetrical front and rear side walls 17 and 18 which are rib-shaped, longitudinally disposed cylindrical wall sections which remain after removal of the upper and lower cylindrical wall sections of the cylinder from which propeller shaft 11 is fabricated.

The rear transverse face of rear cylindrical section 13 is joined coaxially to a larger diameter, annular-shaped flange plate 19. Flange plate 19 provides means for joining it and attached propeller shaft 11 coaxially to the shaft A of an engine or generator. As shown in FIG. 1, flange plate 19 of propeller shaft 11 may be fastened to flange B of engine or generator shaft A by means of bolts 20 passing through holes 21 in flange 19 and holes C in flange B. Bolts 20 are secured by nuts 22. Of course, propeller shaft 11 could be attached to engine or generator shaft A by any other suitable means.

As may be understood best by referring to FIGS. 1 and 4, a plurality of propeller blades 23 are fastened to propeller shaft 11 and are disposed radially outward therefrom. The method of attachment of propeller blades 23 to propeller shaft 11 may be best understood by referring to FIGS. 1, 4 and 5.

Referring now to FIGS. 1 and 5, it may be seen that propeller blades 23 are joined to propeller shaft 11 by means of a fork-like appendage 24 extending downward from the base or root of each propeller blade 23. Fork 24 has an upwardly disposed support rod or shaft 25 fastened at its upper end to the root of propeller blade 23. An inverted U-shaped structure or fork 26 joined perpendicularly to the bottom end of shaft 25 forms front and rear downwardly disposed fork tines 27 and 28, respectively.

Rear tine 28 of each fork 24 is rotatably positioned in one of a plurality of radially disposed, regularly spaced clearance bearing holes 29 provided through the outer cylindrical wall of propeller shaft 11, near the front transverse face of front cylindrical section 12 of the propeller shaft. Support rod 25 of each propeller blade 23 is held in a fixed, radially disposed position relative to propeller shaft 11 by a cylindrical stabilizer ring 29a mounted coaxially over propeller shaft 11. This configuration is effected by a plurality of regular spaced radial holes 29b extending through the cylindrical wall of stabilizer ring 29A. Each hole provides support for a separate support rod 25 passing through hole 29b. Stabilizer ring 29a mounts coaxially over propeller shaft 11 by means of a flat, annular ring 29C joined to the rear surface of the stabilizer ring. Clearance between the inner circumferential surface of ring 29C and the outer circumferential surface of propeller shaft 11 permits rotation of the ring with respect to the propeller shaft.

The front tine 27 of each fork 24 is also mounted rotatably about its longitudinal axis, in a manner to be described below.

As may be seen best by referring to FIG. 5, stabilizer ring 29a provides a support structure for maintaining propeller blade shafts 25 radially disposed with respect to the longitudinal axis of propeller shaft 11. Also, the inner coaxial surface of stabilizer ring 29a limits radially outward movement of propeller blade shaft support fork 24. This secures the propeller blades against excessive outward radial movement in response to centrifugal forces experienced by the blades during rotation of the propeller shaft.

Referring now to FIGS. 1 and 5, it may be seen that pitch control apparatus 10 includes a cylindrical control cylinder 30 positioned coaxially in front of the front transverse surface of cylindrical propeller shaft 11. Control cylinder 30 has approximately the same outer diameter as front cylindrical section 12 of propeller shaft 11. Control cylinder 30 is rotatably supported with respect to front propeller shaft section 12 by means of a cylindrical bearing ring 31. Bearing ring 31 has a smaller outer diameter than the inner diameter of front propeller shaft section 12 and control cylinder 30. Bearing ring 31 is positioned coaxially within front propeller section 12 and control cylinder 30, bridging an axial end gap or spacing between the facing transverse surfaces of the front propeller shaft section and the control cylinder.

Control cylinder 30 contains a plurality of radially disposed, regularly spaced holes 32 through its outer cylindrical wall. The number and spacing of holes 32 matches those of holes 29 in front section 12 of propeller shaft 11. The front tine 27 of each fork 24 fits rotatably down into a bearing or clearance hole 32 in control cylinder 30. One such hole 32 is positioned adjacent to each hole 29 in propeller shaft section 12 which supports the rear tine 28 of the fork.

As may be seen best by referring to FIGS. 1, 5 and 6, a uniform thickness, disc-shaped circular base 33 comprises the front transverse face of control cylinder 30.

As shown in FIG. 4, base 33 includes a rectangular hole 34 cut through the thickness dimension of the base. The longitudinal center line of hole 34 is colinear with a diameter of base 33, and extends radially equal distances from the longitudinal center line of cylinder 30, nearly to the walls of the cylinder.

A pair of closely spaced, parallel cylindrical roller bearings 35 are rotatably mounted to base 33, on either side of hole 34. As may be seen best in FIGS. 1 and 4, an elongated, flat, rectangular metal strip is twisted about its long axis to form a helicoid strip 36. Helicoid strip 36, which has a total twist of at least 90 degrees and up to 180 degrees, extends axially forward through hollow propeller shaft 11, and out through hole 34 in base 33. Helicoid strip 36 tangentially contacts facing cylindrical surfaces of roller bearings 35 positioned on either side of hole 34.

When helicoid strip 36 is moved longitudinally within propeller shaft 11, i.e., forwards or backwards, with respect to control cylinder 30, the twist in the helicoid strip causes a clockwise or counter-clockwise displacement of the transverse axis of the strip. Therefore, since the flat sides of helicoid strip 36 are sandwiched between roller bearings 35, axial motion of the strip causes base 33 of control cylinder 30 fastened to the roller bearings to rotate clockwise or counter-clockwise.

As may be seen best by referring to FIG. 6, rotation of control cylinder 30 about the axis of the propeller shaft 11 causes front tines 27 of forks 24 to move orbitally with respect to rear tines 28. In turn, the displacement of front tines 27 relative to rear tines 28 causes each propeller blade shaft 25 to rotate about its own longitudinal axis an equal amount. The rotation of propeller blade shafts 25 then causes the pitch of each propeller blade to change in unison.

Bearing ring 31 supports control cylinder 30 and permits rotational movement of the control cylinder with respect to front propeller shaft section 12. Also, since the longitudinal spacing between front tines 27 and rear tines 28 of forks 24 changes as control cylinder 30 is rotated with respect to bearing ring 31 and front propeller shaft section 12, bearing ring 31 permits longitudinal movement between the control cylinder and the front propeller shaft section. The distance is greatest when the forks are parallel to the longitudinal axis of the propeller shaft.

As shown in FIG. 6, axial alignment of holes 29 of front section 12 of propeller shaft 11 with holes 32 in control cylinder 30 results in the planes of propeller blades 23 being in parallel alignment with the longitudinal axis of the propeller shaft. This position is referred to as a fully feathered position. Axial alignment of holes 29 and 32 is indicated in FIG. 6 by reference designation "J". In the fully feathered position, the broad, flat surfaces of propeller blades 23 are parallel to air or other fluid flowing parallel to the longitudinal axis of propeller shaft 11. Thus, in the fully feathered position, fluid may move past propeller blades 23 without causing propeller shaft 11 to rotate.

In FIG. 6, clockwise rotation of control cylinder 29 with respect to front propeller shaft section 12 is indicated in the phantom view identified by reference designation "K". In this position, the leading edge of each propeller blade 23 is positioned clockwise with respect to its trailing edge. Thus, air or other fluid impacting propeller blades 23 from the right in FIG. 6 will exert a clockwise torque on the propeller. In the phantom view position designated "L", the leading edge of each propeller blade is positioned counter-clockwise with respect to its trailing edge. In this position, air moving towards the propeller blades from the right will tend to rotate the propeller counter-clockwise.

As has been described above, the present invention affords a novel and efficient means for changing the pitch of propeller blade 23 from zero to positive or negative values by forward or reverse axial motion of helicoid strip 36 within propeller shaft 11. A novel and efficient means for moving helicoid strip 36 a desired axial distance to change the pitch of propeller blades 23 while propeller shaft 11 is rotating will next be described.

Referring now to FIGS. 1, 2 and 3, it may be seen that the rear end of helicoid strip 36 is fastened to an elongated rectangular strip of metal referred to as the helicoid strip support slide 37. Support slide 37 is supported along its longitudinal edges by two elongated support channels 38. Support channels 38 have a generally U-shaped, transverse cross-sectional shape and are disposed longitudinally in diametrically opposed positions along the inner cylindrical wall surface of front section 12 of propeller shaft 11. The longitudinal openings of channels 38 face radially inward towards one another, and slidably support the long edges of support slide 37.

As shown in FIGS. 1, 2 and 3, a thin, uniform thickness, generally semicircular-shaped upper bearing plate 39 is fastened to support slide 37 near the rear transverse surface of the support slide. The flat, diametrical base edge surface of bearing plate 39 is joined to the upper surface of support slide 37 with the rear flat portion of the bearing plate flush with the flat rear edge surface of the support slide.

Bearing plate 39 contains symmetrical, arcuate notches 40 at the diametrically opposed junctions of its flat diametrical base surface with its semicircular surface. Notches 40 are cut completely through the thickness dimension of plate 39. Notches 40 provide clearance openings for front and rear side walls 17 and 18 of intermediate section 14 of propeller shaft 11. Thus, notches 40 permit bearing plate 39 to slide longitudinally along these front and rear side walls.

A lower bearing plate 41 identical to bearing plate 39 and containing notches 42 is fastened to the lower surface of support slide 37 exactly as has been described for upper bearing plate 39. Thus, the general appearance of the rear portion of support slide 37 is that of an elongated rectangular strip with a generally circular disc disposed transversely of its rear edge, with semicircular cutouts on the front and rear circumferential edges of the disc permitting it to move longitudinally along rail-like front and rear side walls 17 and 18 of intermediate section 14 of propeller shaft 11.

Front and rear outer flat annular surfaces of the generally circular bearing plate comprised of upper and lower bearing plate sections 39 and 41 are supported between front and rear ball bearing assemblies 43 and 44 contained within an annular bearing shell 45.

Bearing shell 45 may be moved parallel to the longitudinal axis of propeller shaft 11 by any suitable means. Since propeller shaft 11 and bearing plates 39 and 41 are freely rotatable with respect to bearing shell 45, any mechanism used to move bearing shell 45 longitudinally does not need to rotate with propeller shaft 11. Thus, the present invention affords a novel and efficient means permitting the adjustment of the pitch of propeller blades while the propeller is turning or stationary. Many other ways of moving the helicoid strip are also possible. In some applications, an internal hydraulic ram mechanism may be the best way. In others, a yoke may be preferred.

As shown in FIGS. 1, 2, and 3, a generally conically-shaped cover or fairing 47 joined to the front transverse surface of control cylinder 30 provides an enclosure for the forward components of pitch control mechanism 10 which has a relatively small resistance to air moving longitudinally towards propeller shaft 11.

A basic embodiment of the pitch control mechanism according to the present invention has been described above. The novel and advantageous design of that mechanism affords a high degree of adaptability to modifications of the basic embodiment.

For example, the helicoid control strip may be changed to a different contour which produces non-linear pitch variations as a function of longitudinal displacement of the control strip. The mechanical advantage of the twisting of the propeller blade shafts as a function of control ring rotation with respect to the propeller shaft can be varied by varying the spacing between the front and rear tines of the propeller shaft support fork. Also, the shape of propeller blades may be distorted in a controlled fashion by the pitch control mechanism according to the present invention. This may be accomplished by anchoring one portion of the propeller blades to the stabilizing ring, while rotating another portion of the blades coupled to the support fork. The pitch control mechanism according to the present invention may also be used to simultaneously vary the pitch of a longitudinally disposed array of turbine wheels, such as are employed in turbofan engines. Any type of blade planform may be used with the present invention. The unit can function with 2 blades as well as with a multiplicity of them. An important advantage of the present invention is the fact that the "neutral" point of axial motion of the helicoid strip is arbitrary; thus the blade pitch change may have any desired starting and ending points, and the pitch of the blade in relation to the fork may also be varied depending on the application.

What is claimed is:

1. A mechanism for controlling the pitch of propeller blades comprising:

(a) an elongated hollow cylindrical propeller shaft having a transverse front face perpendicular to the longitudinal axis of said propeller shaft, the cylindrical wall of said propeller shaft containing on a first circumferential circle a short distance rearward of said transverse front face of said propeller shaft a plurality of regularly spaced holes disposed radially outward through said cylindrical wall of said propeller shaft, (b) a cylindrical stabilizer ring of somewhat larger diameter than said propeller shaft rotatably mounted with respect to said propeller shaft in coaxial overlying alignment with the front portion of said propeller shaft, the cylindrical wall of said stabilizer ring containing on a second circumferential circle a short distance forward of said first circumferential circle containing said propeller shaft holes a plurality of radially disposed holes through said cylindrical wall equal in number and angular spacing to said holes through said cylindrical wall of said propeller shaft, (c) a cylindrical control ring of approximately the same diameter as said propeller shaft mounted coaxially to said propeller shaft by means permitting longitudinal as well as rotational movement of said control ring with respect to said propeller shaft, forward of said front transverse face of said propeller shaft, the cylindrical wall of said control ring containing on a third circumferential circle a plurality of radially disposed through said cylindrical wall equal in number and angular spacing to said holes through said cylindrical wall of said propeller shaft, (d) a plurality of fork-like, bifurcated propeller blade supports, each said support having an inverted U-shaped structure forming downwardly depending parallel front and rear fork tines, and a propeller blade support rod extending perpendicularly upwards from the base of said U-shaped structure, parallel to said front and rear fork tines, the rear tine of each said supports being rotatably supported in one of said holes in said propeller shaft, the support rod of each said support extending upward and rotatably through one of said holes in said stabilizer ring, and the front tine of each of said supports being rotatably supported in one of said holes in said control ring, and (e) means for rotating said control ring relative to said propeller shaft, whereby said front tines of said supports may be moved orbitally with respect to said rear tines, thereby effecting rotation of each of said propeller blade support rods about its own longitudinal axis.

2. The mechanism of claim 1 wherein said means for rotating said control ring relative to said propeller shaft comprises a longitudinally movable member disposed within said hollow propeller shaft, means for longitudinally moving said member, and means for converting longitudinal movement of said member into rotational movement of said control ring relative to said propeller shaft.

3. The mechanism of claim 2 further comprising means rotationally decoupled from said propeller shaft for effecting longitudinal movement of said longitudinally movable member.

4. The mechanism of claim 2 wherein said longitudinally movable member has an outer cross-sectional surface which varies as a function of longitudinal distance along said member, and said means for converting longitudinal movement of said member into rotational movement of said control ring relative to said propeller shaft comprises a follower fastened to said control ring responsive to variances of said outer cross-sectional shape of said longitudinally moveable member as said member moves longitudinally with respect to said follower and said control ring.

5. The mechanism of claim 4 wherein said longitudinally moveable member is further defined as an elongated helicoidal.

6. The mechanism of claim 5 wherein said follower is further defined as a member fastened transversely to said control ring, said member having a longitudinally disposed perforation fitting conformally over the transverse cross-sectional surface of said helicoidal, said perforation permitting longitudinally slidable movement of said helicoidal therewithin, whereby longitudinal movement of a specified amount of said helicoidal is effective in rotating said member and said attached control ring an angle equivalent to the angular rotation of the said cross-sectional surface of said helicoidal for said specified amount of longitudinal movement of said helicoidal.

7. The mechanism of claim 6 wherein said helicoidal is further defined as an elongated, rectangular, flat strip of material twisted into a helicoid shape.

8. The mechanism of claim 7 further comprising means rotationally decoupled from said propeller shaft for effecting longitudinal movement of said helicoidal.

9. The mechanism of claim 8 wherein said means rotationally decoupled from said propeller shaft for effecting longitudinal movement of said helicoidal comprising:

(a) means for slidably supporting said helicoidal longitudinally within said propeller shaft, (b) at least one longitudinally elongated opening in the cylindrical wall of the rearward portion of said propeller shaft, (c) at least one generally flat bearing plate fastened to the rear portion of said helicoidal, said bearing plate being oriented transversely to the longitudinal axis of said propeller shaft and said helicoidal and said bearing plate being longitudinally moveable within said longitudinally elongated opening in the cylindrical wall of said propeller shaft, and (d) a bearing support assembly for said bearing plate, said bearing support assembly permitting free rotation of said bearing plate along with said propeller shaft and said helicoidal about the longitudinal axis of said propeller shaft, and said bearing support assembly being longitudinally moveable with respect to the longitudinal axis of said propeller shaft, whereby said bearing plate may be moved longitudinally with respect to said propeller shaft by moving said bearing support assembly longitudinally, said bearing support assembly being rotationally decoupled from said propeller shaft.

10. A mechanism for controlling the pitch of propeller blades comprising:

(a) an elongated hollow cylindrical propeller shaft having a transverse front face perpendicular to the longitudinal axis of said propeller shaft, the cylindrical wall of said propeller shaft containing on a first circumferential circle a short distance rearward of said transverse front face of said propeller shaft a plurality of regularly spaced holes disposed radially outward through said cylindrical wall of said propeller shaft, (b) a cylindrical stabilizer ring of somewhat larger diameter than said propeller shaft rotatably mounted to propeller shaft in coaxial overlying alignment with the front portion of said propeller shaft, the cylindrical wall of said stabilizer ring containing on a second circumferential circle a short distance forward of said first circumferential circle containing holes in said propeller shaft a plurality of holes disposed radially through said cylindrical wall of said stabilizer ring equal in number and angular spacing to said holes in said propeller shaft, (c) a cylindrical control ring of approximately the same diameter as said propeller shaft mounted coaxially to said propeller shaft by means permitting longitudinal as well as rotational movement of said control ring with respect to said propeller shaft, forward of said front transverse face of said propeller shaft, the cylindrical wall of said control ring containing on a circumferential circle a plurality of holes disposed radially through said cylindrical wall of said control ring equal in number and angular spacing to said holes in said propeller shaft, said control ring including thin, parallel sided, disc-shaped base of substantially the same diameter as said control ring fastened to the front transverse face of said control ring, said disc-shaped base containing a perforation through its thickness dimension, said peforation being symmetrically disposed with respect to the longitudinal center line of said propeller shaft, (d) a plurality of fork-like, bifurcated propeller blade supports, each of said supports having an inverted U-shaped structure forming downwardly depending front and rear fork tines, and a propeller blade support rod extending perpendicularly upwards from the base of said U-shaped structure, parallel to said front and rear fork tines, the rear tine of each of said supports being rotatably supported in one of said holes in said propeller shaft, the support rod of each of said supports extending upward and rotatably through one of said holes in said stabilizer ring, and the front tine of each of said supports being rotatably supported in one of said holes in said control ring, and (e) an elongated helicoidal longitudinally disposed and slidably supported coaxially within said propeller shaft, said helicoidal having an external transverse cross-sectional shape slidable conformally within said perforation in said base of said control ring, whereby longitudinal movement of said helicoidal causes rotation of said control ring relative to said propeller shaft, which in turn causes said front tines of said supports to move orbitably with respect to said rear tines of said supports, thereby effecting rotation of each of said propeller blade support rods about its own longitudinal axis.

11. The mechanism of claim 10 wherein said helicoidal is further defined as an elongated, rectangular flat strip of material twisted into a helicoid shape.

12. The mechanism of claim 11 wherein said perforation in base of said control ring is further defined as being rectangular, the longitudinal axis of said rectangle being colinear with a diameter of said base.

13. The mechanism of claim 12 further comprising a pair of closely spaced, parallel cylindrical roller bearings rotatably mounted to the outer transverse surface of said base of said control ring, said roller bearings lying equidistant from the longitudinal center line of said perforation with their longitudinal axes parallel to said center line and to the front transverse surface of said base, the cylindrical surfaces of said roller bearings tangentially contacting opposite faces of said helicoid strip.

14. The mechanism of claim 13 further comprising:
(a) means for slidably supporting said helicoid strip within said propeller shaft,
(b) at least one longitudinally elongated opening in the cylindrical wall of the rearward portion of said propeller shaft,
(c) at least one generally flat bearing plate fastened to the rear portion of said helicoid, said bearing plate being oriented with its plane transverse to the longitudinal axes of said propeller shaft and said helicoidal, said bearing plate being longitudinally moveable within said longitudinally elongated opening in the cylindrical wall of said propeller shaft, and
(d) a bearing support assembly for said bearing plate, said bearing support assembly permitting free rotation of said bearing plate along with said propeller shaft and said helicoidal about the longitudinal axis of said propeller shaft, and said bearing support assembly being longitudinally moveable with respect to the longitudinal axis of said propeller shaft, whereby said bearing plate may be moved longitudinally with respect to said propeller shaft by moving said bearing support assembly longitudinally, said bearing support assembly being rotationally decoupled from said propeller shaft.

15. The mechanism of claim 13 further comprising:
(a) an elongated, uniform transverse cross-section support slide fastened axially to the rear end of said helicoid strip,
(b) bearing means within said propeller shaft permitting longitudinally slidable motion of said support slide and said helicoid strip,
(c) diametrically opposed, longitudinally elongated, saddle-shaped openings in opposite cylindrical walls of said propeller shaft forming diametrically opposed, longitudinally disposed rib-shaped cylindrical wall sections,
(d) a generally flat, uniform thickness upper bearing plate having a generally semi-circular shape fastened transversely to the rear portion of said support slide, the flat, diametrical base surface of said semi-circular bearing plate being congruent with the upper surface of said support slide, and the junction of said diametrical base and the arcuate surface of said bearing plate containing a concave notch adapted to provide clearance for said rib-shaped wall sections of said propeller shaft,
(e) a lower bearing plate of mirror-image construction to said upper bearing plate attached in a mirror image position to said lower surface of said support slide, and
(f) an annular disc-shaped cylindrical bearing support assembly for said upper and lower bearing plates having an inner diameter larger than the outer diameter of said propeller shaft, said bearing support assembly having inner facing friction minimizing members contacting opposite sides of bearing plates, permitting free rotation of said bearing plates while said bearing support assembly is moved longitudinally with respect to said propeller shaft, said bearing support assembly remaining rotationally decoupled from said propeller shaft.

16. The mechanism of claim 15 wherein said friction minimizing members comprise bearings.

17. The mechanism of claim 15 wherein said bearing means permitting longitudinally slidable motion of said support slide and said helicoid strip within said propeller shaft comprises elongated channels having a uniform, generally U-shaped transverse cross-section disposed longitudinally in diametrically opposed positions along the inner cylindrical wall surface of said propeller shaft, said channels having friction minimizing inner surfaces supporting the outer longitudinal edges of said support slide.

18. The mechanism of claim 15 wherein said mounting means permitting axial as well as rotational movement of said control ring with respect to said propeller shaft comprises a cylindrical bearing ring having a friction minimizing outer circumferential surface mounted coaxially within said propeller shaft and underlying a portion of the inner circumferential surface of said control ring.

19. The mechanism of claim 15 wherein said cylindrical stabilizer ring is rotatably mounted with respect to said propeller shaft by means of a flat, annular ring joined to a transverse surface of said stabilizer ring, said flat annular ring having an inner diameter sufficiently larger than the outer diameter of said propeller shaft to permit free rotation of said annular ring with respect to said propeller shaft.

20. The mechanism of claim 19 further comprising a hollow cylindrical shell having a conically shaped cover fastened to said base of said control ring, thereby providing a cover for the front portion of said mechanism which minimizes wind resistance.

* * * * *